Aug. 21, 1951  R. H. PAUL  2,564,991
CALCULATOR
Filed Sept. 20, 1949  3 Sheets-Sheet 1

INVENTOR
Robert H. Paul,

BY Wenderoth, Lind & Ponack
ATTORNEYS

Aug. 21, 1951
R. H. PAUL
2,564,991
CALCULATOR
Filed Sept. 20, 1949
3 Sheets-Sheet 2
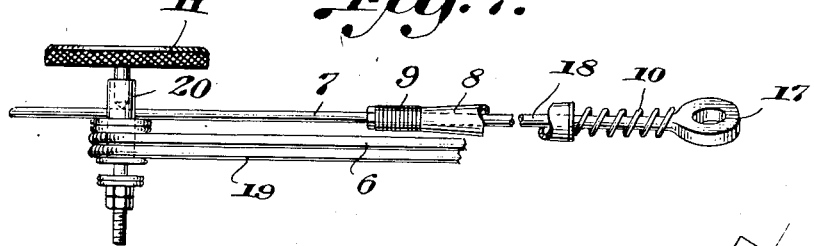
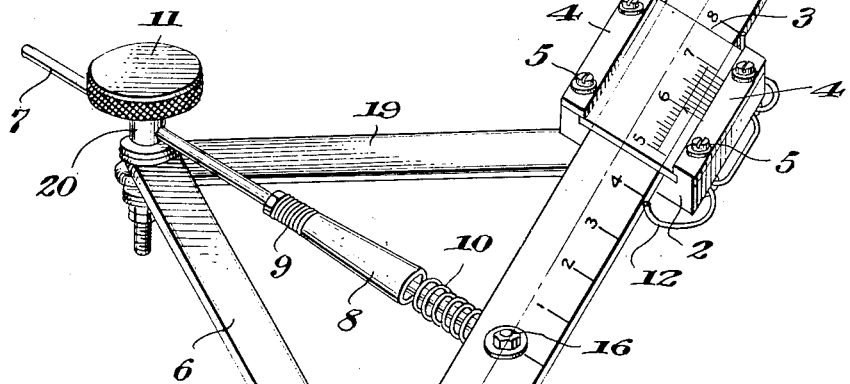
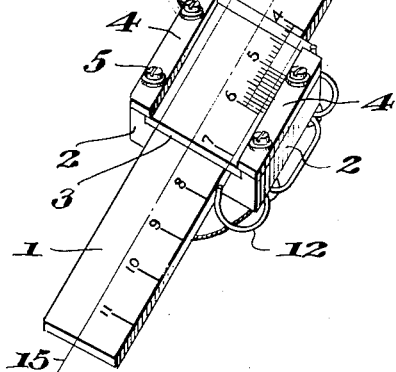
INVENTOR
Robert H. Paul,
BY *Windirath, Lind & Ponack*
ATTORNEYS Aug. 21, 1951  R. H. PAUL  2,564,991
CALCULATOR
Filed Sept. 20, 1949  3 Sheets-Sheet 3
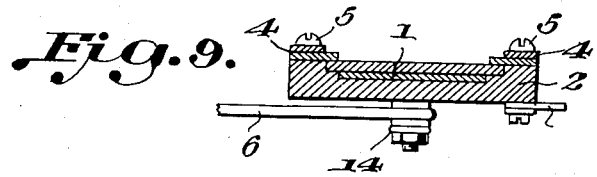
Fig. 9.
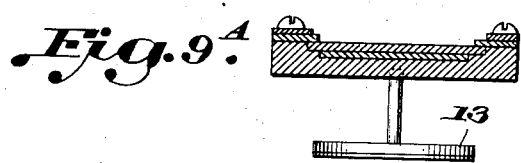
Fig. 9ᴬ.
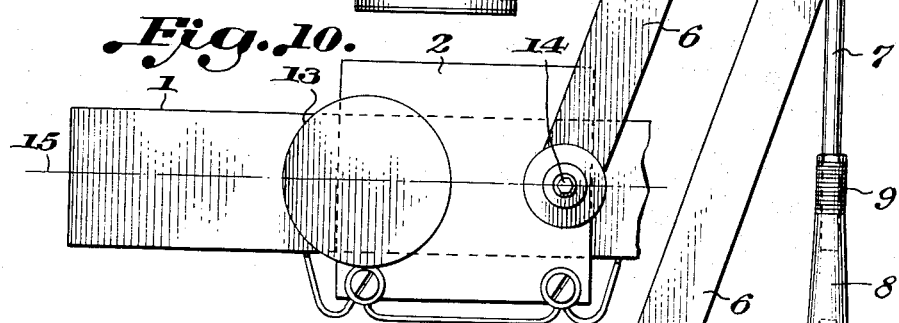
Fig. 10.
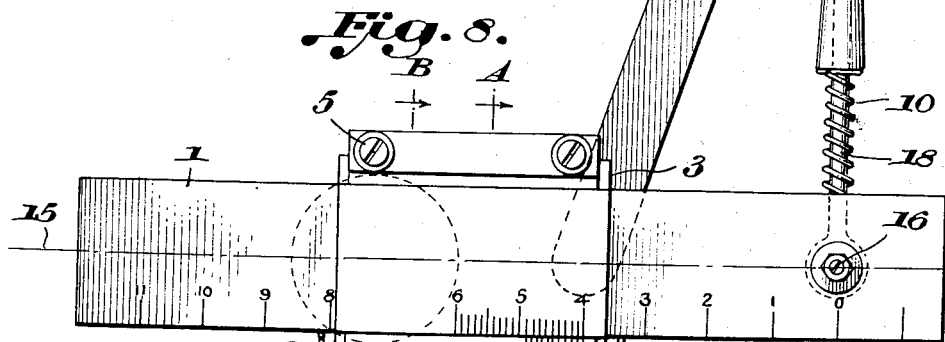
Fig. 8.
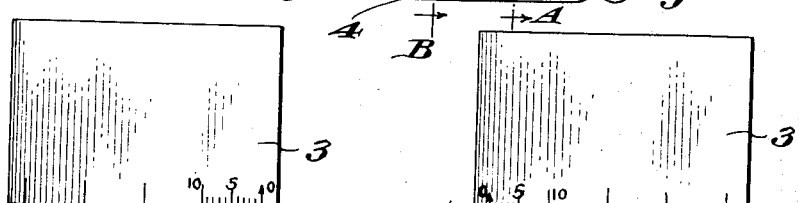
Fig. 11.  Fig. 12.
INVENTOR
Robert H. Paul,
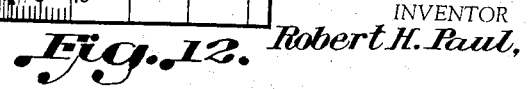
BY
ATTORNEYS Patented Aug. 21, 1951

2,564,991

UNITED STATES PATENT OFFICE 2,564,991

CALCULATOR

Robert H. Paul, Kollupitiya, Ceylon

Application September 20, 1949, Serial No. 116,686

2 Claims. (Cl. 235—61)

The ordinary 11 inch slide rule used by scientists and engineers is too well known to need description. It consists of a main rule in which are marked a scale or scales which correspond to the logarithms of numbers. Moving in this rule is a slide which is also marked in a scale or scales which correspond to those in the main rule. Also moving on the main scale is a cursor on which is marked a hair line. Multiplication of two numbers X and Y is performed by setting the cursor line at X on the main scale, moving the slide till the number one on the slide coincides with the hair line, moving the cursor till the hair line coincides with Y on the slide, and reading off the product as the position of the hair line on the main scale. The operation depends on the principle that the logarithm of the product of two numbers is the sum of the logarithm of the number themselves. In dividing one number by another the logarithm of the second number is subtracted from that of the first. This operation can also be performed on the slide rule. In particular a series of multiplications combined with divisions can be performed rapidly within the limits of the scales. When the limits of the scales are likely to be overrun, the artifice of dividing or multiplying by ten or powers of ten is used to keep the numbers within the limits of the scale.

The 11 inch slide rule is marked on the main ruler with two scales, the so called A and D scales marked up to 100 and 10 respectively, and the slide is marked with scales, so called B and C scales, also marked up to 100 and 10. A and B scales are the squares of C and D. For accurate work the scales C and D have to be used. The scales are characterised by the varying degrees of accuracy obtainable in different parts. In the region between 1 and 2 for instance in the C and D scales numbers can be read to three significant figures without eye estimation and to four figures with eye estimation and in the region between 9 and 10, readings are possible to two significant figures without eye estimation and three with eye estimation. It is not possible to use accurate methods of reading a position between scale marks by the use of the vernier or micrometer because the logarithmic scale is non-uniform. This is the inherent defect in the ordinary slide rule.

Other slide rules have been invented to improve the accuracy of the 11 inch slide rule. One method is the use of a longer, for instance the 22 inch slide rule, combined with a magnifying cursor which gives an added figure of accuracy. The second method is the use of a circular scale (watch pattern) in which the numbers are marked in a series of concentric circles. In the Fowler's slide rule for instance numbers from one to 10 are marked in 6 concentric circles giving an overall length of scale of 50 inches as compared with 10 inches of an ordinary slide rule. It is not possible on this scale to have a second scale sliding in the first scale so that the main scale has to be made movable with respect to a fixed datum line, and an independently movable cursor line has also to be provided.

A third method of increasing the accuracy is by the use of a logarithmic scale marked on a helix on the outside of a cylinder. Here again a long length of scale can be achieved but a datum and cursor have to be provided as only a single scale is used.

In the slide rule of the present invention uniform scales are provided so that it is believed for the first time the possiblity of accurate reading by utilising the micrometer eye piece, vernier or other scientific devices is provided. The limit of accuracy is set only by the accuracy of manufacture and not by inherent causes such as the non linearity of the scale.

The invention will now be described with reference to the accompanying drawings in which:

Fig. 1, Sheet 1, shows chords of a circle intersecting externally.

Fig. 2, Sheet 1, shows chords of a circle intersecting internally.

Fig. 3, Sheet 1, shows chords of a circle intersecting internally, one of the chords being bisected at point of intersection.

Fig. 4, Sheet 1, shows the invention diagrammatically.

Fig. 5, Sheet 2, shows a perspective view of one embodiment of the invention.

Fig. 6, Sheet 2, shows one of the fixed links.

Fig. 7, Sheet 2, is an end elevation showing the fixed links pivoted on bearing pin through which variable arm passes.

Fig. 8, Sheet 3, is a plan view of the left hand half of instrument.

Fig. 9, Sheet 3, is a section in line AA of Fig. 8.

Fig. 9A, Sheet 3, is a section in line BB of Fig. 8.

Fig. 10 is a plan view of left hand cursor looking upwards.

Fig. 11 is a view of glass scale of left hand cursor.

Fig. 12 is a view of glass scale of right hand cursor.

Figure 1:
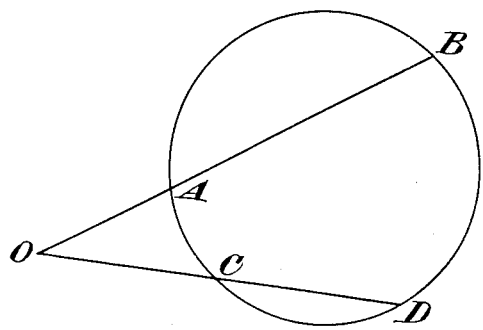
Figure 2:
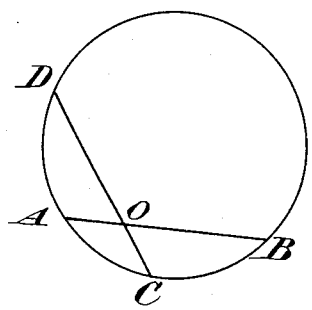

The principle underlying the invention is the well known proposition in Euclid that when two chords of a circle intersect externally or internally the rectangles formed by the segments of the chords are equal. Fig. 1 shows chords intersecting externally. Here $OA \times OB = OC \times OD$. Fig. 2 shows chords intersecting internally. Here $AO \times OB = CO \times OD$. Both the above principles can be used in the slide rule of my invention. It is found mechanically more convenient to arrange an apparatus based on internal intersection. A rule which is based on external intersection will have to have provisions for crossing over of cursors, as will be seen later. It will however give a slide rule of shorter overall length.

Figure 3:
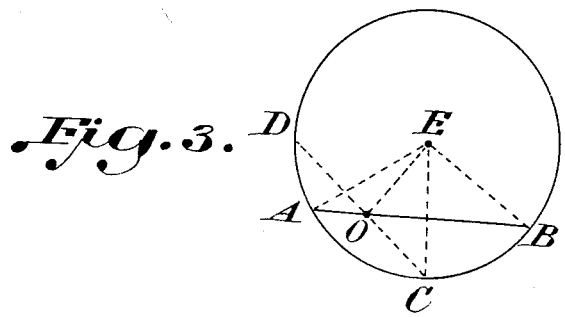

In particular, if in Fig. 2, the chord CD is intersected by AB at its mid-point then (Fig. 3) $AO \times OB = CO \times OD = OC^2 = EC^2 - OE^2$. Now $EC = EA = EB =$ radius of the circle $R$ (say). Therefore $AO \times OB = R^2 - OE^2$. If R and OE are fixed the product $AO \times OB$ is constant. In particular if OE is fixed and EA and AB are fixed radial arms free to slide along the line AB then the product $AO \times OB$ is constant.

Figure 4:
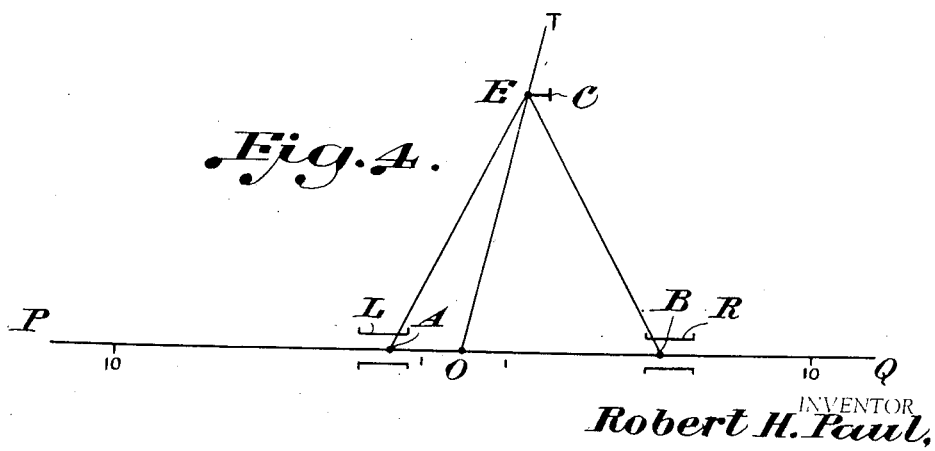

The practical embodiment of the above principle is shown diagrammatically in Fig. 4, where PQ represents the centre line of a main scale divided into 2 portions OP and OQ which are scaled off from 0 to 10 in the directions OP and OQ respectively as shown. On the left hand portion a cursor L is adapted to slide. The position of L on the scale can be read off by a vernier attached to L (not shown). The zero divisions of this vernier points to the centre of the bearing A of fixed link AE. Similarly R is the right hand cursor sliding on OQ provided with a vernier whose zero coincides with the centre of the bearing B of fixed link BE. AE and BE are fixed equal links representing the radii of the fixed circle. AE is pivoted to the cursor L at A and to a pin at E. BE is pivoted to the cursor R at B and to the pin at E to which AE is pivoted. OT represents an arm pivoted at 0 to the main scale and slidable in a hole in the pin at E. When necessary the arm OT can be clamped to the pin at E by means of clamping screw C. It was shown that $AO \times OB = R^2 - OE^2$. Since $R = AE = BE$ is fixed the product $AO \times OB$ is solely dependent on OE. If the arm OT is clamped at E and the cursors are made to slide along the scale, the cursors will slide in such a way that $AO \times OB$ is constant.

Suppose it is required to use the slide rule for calculating the product XY. Undo clamp C and set the number X on the left hand cursor by moving it along OP. Set the number Y on the right hand cursor by sliding it along OQ. The verniers are used in the above manipulation to set the cursors exactly on the required points of the scale. Now the clamp C is locked, thereby making the length OE fixed. Movement of the cursors cannot now take place independently of each other, but as explained above, they move relatively to each other such that the product $AO \times OB$ remains constant. Now the left hand cursor L is moved till the zero mark in vernier points to 1. Then the reading of the right hand cursor gives the product. In case the latter manipulation makes R overshoot the scale, then L is moved so that the zero of vernier points to 10 on the scale. Then the right hand vernier reading gives $\frac{1}{10}$ of the required product. In the above it is assumed that X and Y are both as shown 10 or greater than 1. Numbers outside these limits are divided or multiplied by 10, or powers of ten till they are within these limits as in calculation with the ordinary slide rule.

To obtain the value of $$\frac{XY}{Z}$$

the above procedure is followed up to the clamping of the screw G which makes the product $AO \times OB = XY$ constant. Then the left hand cursor is moved till the zero point of the vernier points to Z in the scale. The reading of the right hand vernier gives the result. Further manipulation of the instrument for obtaining the product of a series of numbers divided by the product of another series of numbers will now be apparent to those accustomed to manipulation with the ordinary slide rule.

In the practical embodiment of the instrument the index number 1 denotes the main metal scale which is marked off from the centre in both directions in 11 main divisions each of which is subdivided into 10 sub-divisions. The line 15 in Figs. 5, 10 and 8 denote the geometrical centre line of this metal scale. Index 16 Figs. 5 and 8 denotes the nut for tightening a bearing pin on the underside of the metal scale. On the bearing pin is mounted the bearing 17 of the variable length arm shown at the top in Fig. 7. The variable arm rotates with centre at the zero point of both scales. The variable length arm comprises the bearing 17 to which is fixed the right hand screwed pin 18, a left hand screwed pin 7 passing through a hole in the bearing pin 20, the nut 8 one half of which is right hand threaded to co-operate with 18, and the other hand left hand threaded to co-operate with 7, and the springs 9 and 10 abutting against the nut 8 and against fixed stops on 7 and 18 respectively. Instead of the right and left hand screw arrangement it may be preferred in some cases to have both screws either right handed or left handed but with different pitches.

The cursor 2 is grooved so as to allow the scale 1 to slide along the grove (see Fig. 9). Keeping the metal scale in position in its groove is the glass vernier plate 3 (see also Fig.11) which is held firmly in the cursor by packing pieces 4 and screws 5. 10 divisions of the vernier plate correspond to 9 divisions on the main scale. Mounted on the underside of the cursor is the bearing pin for the fixed link 6 which is held firmly but rotatably in contact with the bearing pin by means of a washer, spring washer and nuts generally shown at 14. The whole assembly is of such a nature that the zero line of the vernier in the glass plate and centre line of scale should intersect at the centre of the bearing pin at 14 of link 6. As the cursor moves along the scale the centre of the bearing pin moves along the centre line 15 of the main scale. Its position on the scale is read off by the vernier which moves in a line parallel to 15 along the subdivisions of the main scale. A spring 12 may be fitted to the cursor to take up any back lash due to inaccuracies in machining the groove in the cursor for the metal scale. The clamping screw 13 passes through the cursor and may be used to clamp the cursor in any desired position with regard to the metal scale.

The right hand cursor is substantially of the same construction. The following differences will however be observed. The inner plate has zero on the left hand side (vide Fig. 12) instead of the right hand side as in Fig. 11. The bearing pin for fixed link 19 will also be in left hand edge of the cursor in line with the zero line of the vernier plate. The clamping screw corresponding to 13 will be on the right hand side. The bearing for fixed link 19 in the cursor is so arranged to allow the link 19 and the link 6 to move in parallel horizontal planes without interfering with each other. The other ends of fixed links 6 and 19 are mounted on the bearing pin 20 which is common to both. A hole is drilled through the bearing pin 20 to allow the pin 7 to pass through. The pin 7 can be locked to the bearing pin 20 by clamping screw 11 when desired.

It will be observed that when one cursor is locked on to the scale and the pin 7 clamped down by 11 the other cursor can be moved along the scale by the operation of nut 8 which shortens or lengthens the variable arm. By using fine screw threads on the nut 8 of nearly equal pitch a fine movement can be secured.

For the successful operation of an instrument of this kind a very high degree of accuracy in workmanship should be assured. In particular all bearings and slides must be free from back lash and accuracies of much finer order than one thousandth of an inch must be assured. It may be possible to overcome the sliding friction at the cursors by providing accurately machined rollers on the cursors for the metal rule to roll on.

If in the instrument illustrated the main divisions are 1 centimeter apart and the subdivisions one millimeter apart readings in all points of the instrument can be obtained to a 3 figure accuracy, using the vernier illustrated, using the naked eye for estimation. A high degree of precision is however necessary in the slides and bearings, usually of the order of $\frac{1}{10}$ of a millimeter. A moving eye-piece with micrometer attached to the eye-piece, as used in theodolites to measure fractions of a second can be used instead of a vernier. In this way a five figure precision may be obtainable in the results, but of course the slides and bearings must be finished off with much higher accuracy than in the previous instance.

For very accurate work however a scale which extends to 100 centimeters on either side may be used. This will make a very cumbersome instrument, but will give extremely high degrees of accuracy if well made and fitted with micrometer eye-pieces. It may also be realised that errors in bearings and slides affect the readings to a great degree only when one or other of the slides is near the centre of the instrument. In a slide rule extending 100 centimeters either way it is not necessary to move the slides (for accurate work) nearer the centre than 10 centimeter mark. This will eliminate the inaccuracy of the instrument with scales going up to 10 centimeters either way where it is necessary to bring one or other of the slides to the 1 centimeter mark. The weight of the instrument can be reduced by using duraluminium for the metal parts.

I claim:

1. A calculator rule comprising a main scale comprising two scales each graduated from the center in opposite directions, two cursors adapted to move along the scale, two equal fixed links pivoted at one end in the cursors on pins which move along the center line of the scales and to a common bearing pin at the other end through which passes a variable length arm which is pivoted at the center of the main scale, and which can be clamped at any desired point to the bearing pin.

2. A calculator rule comprising a main scale graduated from the center in opposite directions, two cursors adapted to move along said main scale, two fixed links pivoted at one end thereof to said cursors and to a common member at the other end thereof, a variable length arm pivoted at the center of said main scale and passing through said common member, said arm being securable at any point thereof in said common member.

ROBERT H. PAUL.

REFERENCES CITED

The following references are of record in the file of this patent:

UNITED STATES PATENTS

| Number | Name | Date |
| --- | --- | --- |
| 1,000,562 | Steber | Aug. 15, 1911 |
| 1,150,771 | Keuffel | Aug. 17, 1915 |
| 1,605,922 | Cook | Nov. 9, 1926 |
| 2,251,155 | Neuhaus | July 29, 1941 |
| 2,386,555 | Hughes | Oct. 9, 1945 |
| 2,440,438 | Frink | Apr. 27, 1948 |

OTHER REFERENCES

Keuffel & Esser Co.'s Catalogue, 40th edition, published by K. & E. Co. in 1944, 127 Fulton St., New York, N. Y., pages 304 and 283.